(12) United States Patent
Birolleau et al.

(10) Patent No.: US 12,003,153 B2
(45) Date of Patent: Jun. 4, 2024

(54) METHOD FOR WINDING AN ELECTRIC MACHINE ROTOR

(71) Applicants: RENAULT S.A.S, Boulogne-Billancourt (FR); NISSAN MOTOR CO., LTD., Yokohama (JP)

(72) Inventors: Damien Birolleau, Montigny-le-Bretonneux (FR); Emmanuel Motte, Saint Jean du cardonnay (FR); Daniella Vivas-Marquez, Guyancourt (FR)

(73) Assignees: RENAULT S.A.S, Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 58 days.

(21) Appl. No.: 17/791,801

(22) PCT Filed: Nov. 30, 2020

(86) PCT No.: PCT/EP2020/083938
§ 371 (c)(1),
(2) Date: Jul. 8, 2022

(87) PCT Pub. No.: WO2021/139925
PCT Pub. Date: Jul. 15, 2021

(65) Prior Publication Data
US 2023/0073798 A1    Mar. 9, 2023

(30) Foreign Application Priority Data

Jan. 10, 2020 (FR) ...................................... 2000244

(51) Int. Cl.
*H02K 19/12* (2006.01)
*H02K 1/26* (2006.01)
(Continued)

(52) U.S. Cl.
CPC ............... *H02K 19/12* (2013.01); *H02K 1/26* (2013.01); *H02K 3/28* (2013.01); *H02K 3/46* (2013.01);
(Continued)

(58) Field of Classification Search
CPC .. H02K 3/28; H02K 3/51; H02K 1/24; H02K 2213/03; H02K 19/12; H02K 1/26;
(Continued)

(56) References Cited

U.S. PATENT DOCUMENTS

2010/0019711 A1   1/2010  Yen
2015/0145364 A1*  5/2015  Holcomb ............... H02K 53/00
                                              74/DIG. 9
2019/0296623 A1   9/2019  Herrmann

FOREIGN PATENT DOCUMENTS

DE   10 2016 224 916 A1   6/2018
GB       2 362 269 A      11/2001
JP       2005-287281 A    10/2005

OTHER PUBLICATIONS

International Search Report dated Dec. 22, 2020 in PCT/EP2020/083938 filed on Nov. 30, 2020.
(Continued)

*Primary Examiner* — Antony M Paul
(74) *Attorney, Agent, or Firm* — Oblon, McClelland, Maier & Neustadt, L.L.P.

(57) ABSTRACT

A wound rotor, such as a wound rotor for an electric machine, includes a shaft having a main axis. The shaft includes a manifold. The wound rotor also includes a winding wire and n poles wound and ordered with an ascending order number obtained by rotation about the main axis. The n wound poles can be distributed radially about the main axis. The n poles are wound with the wire in series in (Continued)

turn according to their ascending order numbers, the last pole, however, not being wound last.

16 Claims, 3 Drawing Sheets

(51) Int. Cl.
    *H02K 3/28*     (2006.01)
    *H02K 3/46*     (2006.01)
    *H02K 13/02*     (2006.01)
    *H02K 15/095*     (2006.01)
    *H02K 19/26*     (2006.01)

(52) U.S. Cl.
    CPC ........... *H02K 13/02* (2013.01); *H02K 15/095* (2013.01); *H02K 19/26* (2013.01); *H02K 2213/03* (2013.01)

(58) Field of Classification Search
    CPC ........ H02K 3/527; H02K 23/58; H02K 17/42; H02K 17/00; H02K 19/00; H02K 19/02; H02K 1/223; H02K 17/22; H02K 3/12; H02K 1/18; H02P 1/24; H02P 1/26; H02P 1/42; H02P 1/46; H02P 1/465; H02P 1/48; H02P 6/12; H02P 7/00; H02P 23/07; H02P 25/00; H02P 25/022; H02P 25/062; H02P 25/064; H02P 25/032; H02P 25/034; H02P 25/08; H02P 25/10; H02P 27/00; H02P 27/06; H02P 27/08; H02P 29/00; H02P 2207/05; H02P 2207/055; H02P 6/00; H02P 6/32; H02P 2101/45; H02P 25/20

See application file for complete search history.

(56) References Cited

OTHER PUBLICATIONS

Preliminary French Search Report dated Sep. 18, 2020 in French Application 2000244 filed on Jan. 10, 2020.

* cited by examiner

METHOD FOR WINDING AN ELECTRIC MACHINE ROTOR

TECHNICAL FIELD OF THE INVENTION

The invention relates to a wound rotor of an electric machine. The invention also relates to an electric machine comprising such a wound rotor. The invention also relates to a vehicle comprising such a wound rotor and/or such an electric machine. The invention finally relates to a method for attaining such a wound rotor.

PRIOR ART

An electric machine, particularly a motor vehicle electric traction machine, may comprise a wound rotor. Such a wound rotor generally comprises a shaft and a slipring and a plurality of poles wound by a wire. The winding of the wire, which is generally of the enameled copper type, is performed on a bundle or stack of laminations. In order to allow electric current to pass in this coil, the two ends of the copper wire are connected to the slipring by hooks. Such a slipring allows electrical energy to pass between a fixed part and the wound rotor (rotary part).

The passage or path of the winding at the slots and/or nearby connections of such a shaft and/or such a slipring is critical.

Specifically, poor routing of the winding wire to the connection may lead to incorrect positioning of the wire in the connecting hook. Residual stresses in the connection (tension in the wire and in the connection at the moment of attachment of the wire to the hook generally by crimping) and/or rotational mechanical stresses (centrifugal force) may then result. Poor crimping of the wire may also cause the wire to slip out of the hook. An opening of the hook and/or breakage of the wire and/or breaking of the connecting hook may also occur.

Furthermore, this passage of winding wire needs to be compatible with the method for producing the coil which is complex. This winding passage must allow the two ends of the winding wire to be crimped reliably at the two hooks in order to make the connections. The winding passage must offer the winding wire a mechanical integrity that is suited to the operating stresses, particularly centrifugal force and/or vibration.

SUMMARY OF THE INVENTION

The object of the invention is to provide a method for obtaining a wound rotor that overcomes the abovementioned disadvantages. In particular, the invention allows the mechanical robustness of the connection of the winding wire to the shaft and/or the slipring of a wound rotor to be assured.

SUMMARY OF THE INVENTION

In order to achieve this objective, the invention relates to a wound rotor, notably a wound rotor for an electric machine, the wound rotor comprising a shaft with main axis, the shaft optionally comprising a slipring, the wound rotor comprising a winding wire and n wound poles ordered in ascending numerical order obtained by rotation about the main axis, notably n wound poles distributed radially about the main axis, the n poles being wound with the wire in series turn by turn according to their ascending numerical order, although the last pole is not the last to be wound.

The penultimate pole may be wound after the last pole. The antepenultimate pole is wound after the last pole.

Upstream of the first pole, the wire may rest against the shaft at a first non-zero angle about the main axis.

Downstream of the last pole to be wound, the wire rests against the shaft at a second non-zero angle about the main axis.

The wound rotor may comprise pins intended to facilitate the winding of the wire, notably between two adjacent poles and/or between each pole and the shaft and/or the slipring, notably pins running parallel or substantially parallel to the main axis.

The invention further relates to an electric machine, notably a vehicle traction electric machine, notably for a motor vehicle, comprising a wound rotor as defined hereinabove.

The invention further relates to a vehicle, notably a motor vehicle, comprising a wound rotor as defined hereinabove and/or an electric machine as defined hereinabove.

The invention further relates to a method for obtaining a wound rotor as defined hereinabove, the method comprising steps of winding the n poles with the wire in series turn by turn in their ascending numerical order, although the last pole is not the last to be wound.

INTRODUCTION TO THE FIGURES

These objects, features and advantages of the present invention will be set out in detail in the following description of some embodiments given nonlimitingly with reference to the attached figures among which:

DETAILED DESCRIPTION

Figure 1:
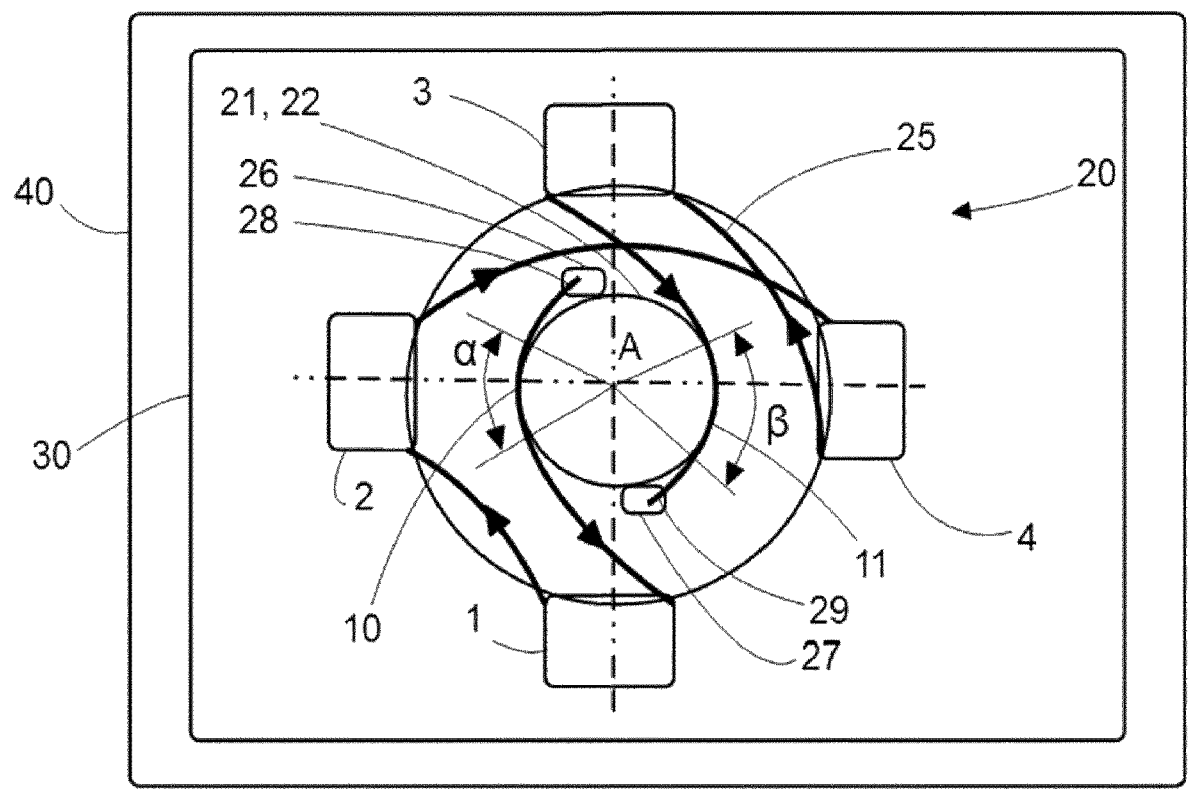
FIG. 1 is a schematic view of a vehicle comprising an electric machine comprising a four-pole wound rotor according to one embodiment.

FIG. 1 schematically illustrates a vehicle according to one embodiment, for example a motor vehicle 40. The vehicle comprises an electric machine 30 according to one embodiment, for example an electric motor providing the traction and/or propulsion of the vehicle. The electric machine 30 comprises a wound rotor 20 according to one embodiment. The wound rotor 20 comprises a shaft 21 of main axis A and a slipring 22 (also known as a slip ring). The slipring 22 and the shaft 21 are assembled coaxially, or substantially coaxially, along the main axis of rotation A about which the wound rotor 20 is intended to rotate.

Figure 2:
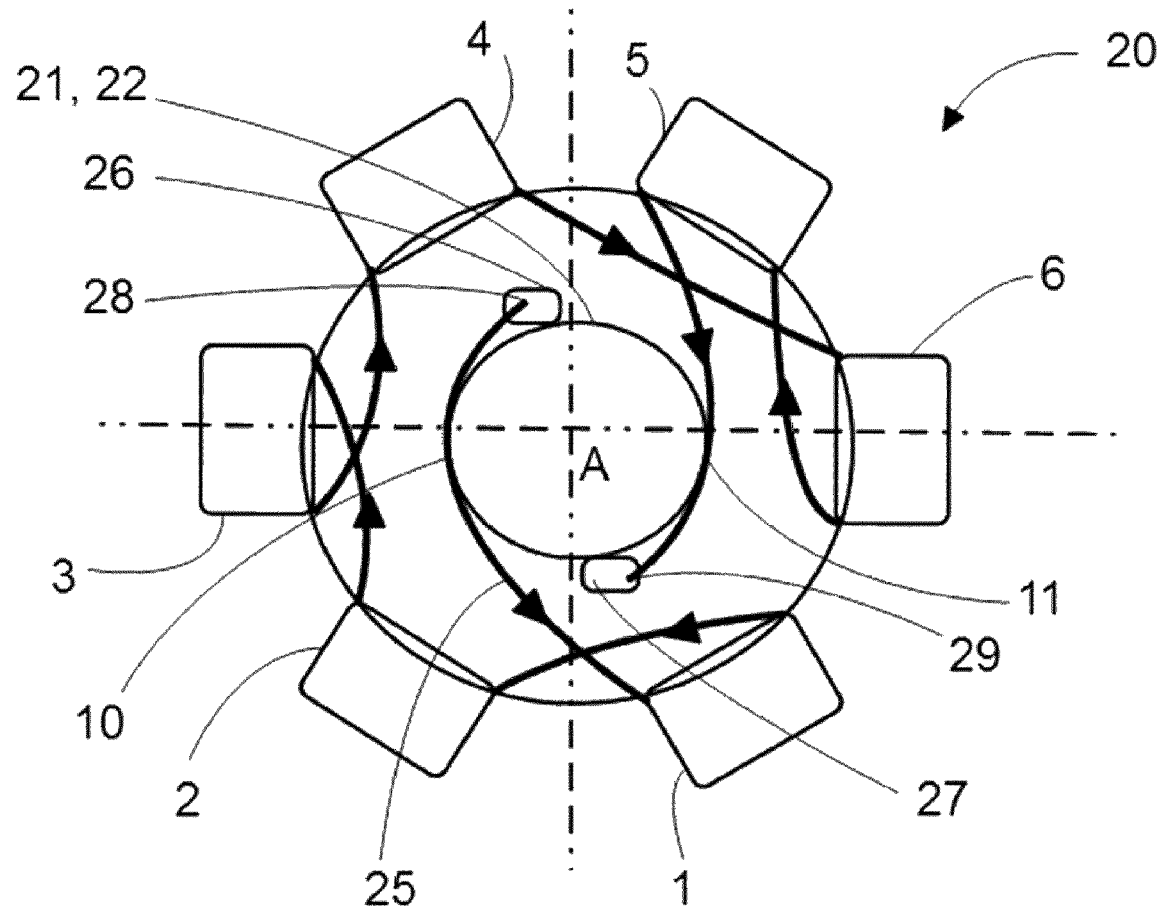
FIG. 2 is a schematic view of a six-pole wound rotor according to another embodiment.
Figure 3:
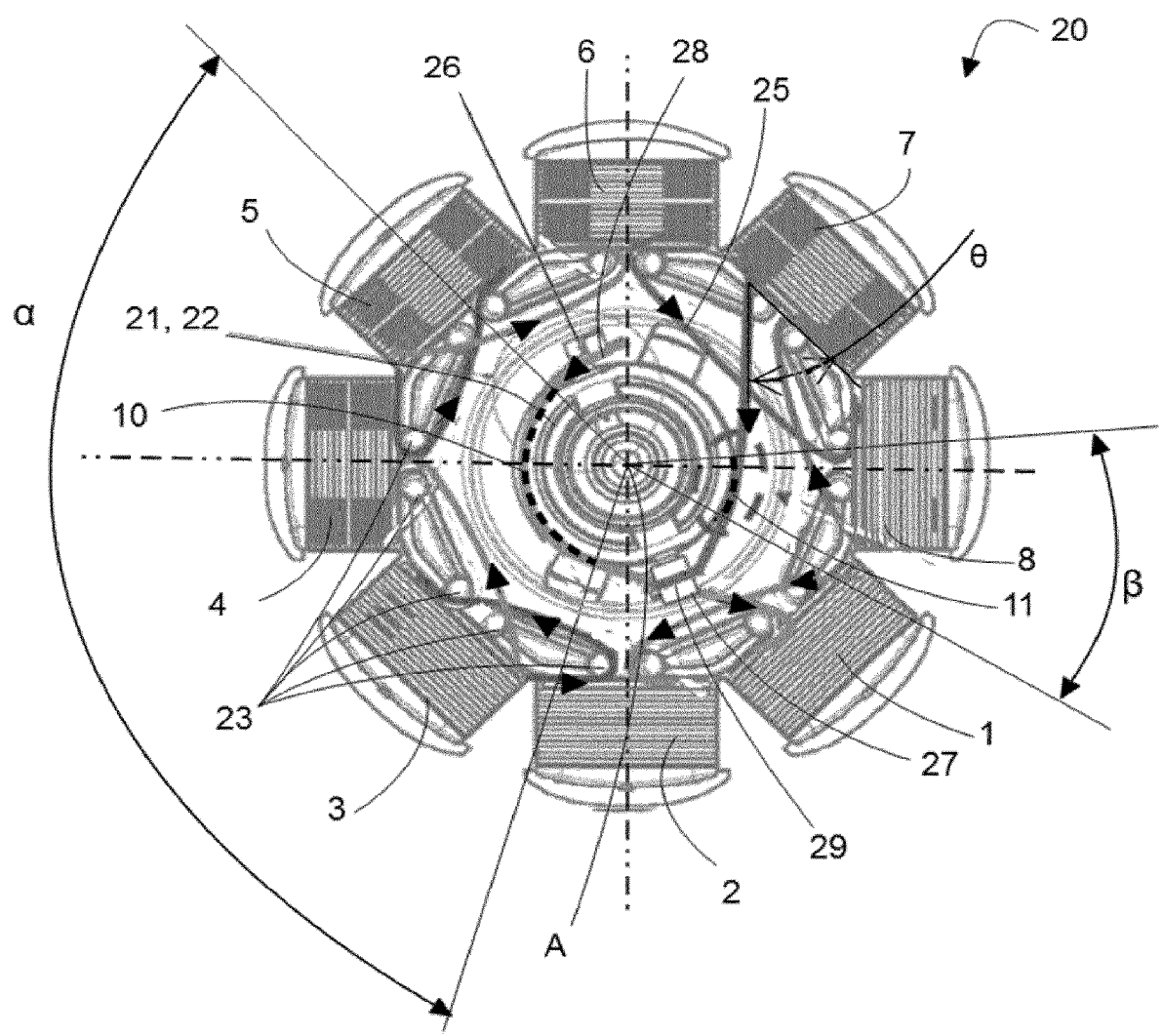
FIG. 3 is a schematic view of an eight-pole wound rotor according to another embodiment.

As illustrated in FIGS. 1, 2 and 3, the wound rotor 20 comprises a winding wire 25. The wire 25 is for example made of copper, for example enameled copper.

More specifically, the wound rotor 20 comprises n wound poles 1, 2, 3, . . . , n−2, n−1, n. The n poles are preferably ordered in ascending numerical order obtained by rotation about the main axis A. As a preference, as illustrated in the figures, the n wound poles 1, 2, 3, . . . , n−2, n−1, n are numbered or referenced or identified by assigning them increasing numerical order numbers working clockwise about the axis A, each pole being associated with a single number in the numerical order. Further, the n poles are distributed radially or substantially radially about the main axis A. The n poles are wound with the wire 25 in series turn by turn in their ascending numerical order, although the last pole n is not the last one to be wound, as will be explained hereinafter.

The first pole is therefore associated with the number 1 in the numerical order. The second pole is associated with the number 2 in the numerical order. The antepenultimate pole is associated with the number n−2 in the numerical order. The penultimate pole is associated with the number n−1 in the numerical order. The last pole is associated with the number n in the numerical order.

The topological order of the poles defined hereinabove is therefore different than the chronological order in which the poles are wound, as will be explained in greater detail hereinafter.

Note that, prior to winding, a first end 28 of the wire 25 is first fixed to a first connection means 26 arranged on the shaft 21 and/or on the slipring 22.

As a preference, as illustrated in the figures, the first connection means 26 is arranged on the opposite side of the main axis A to the pole 1. In other words, the first connection means 26 is positioned near a pole positioned facing, or substantially facing, the pole 1 from the other side of the main axis A.

The first connection means 26 is, for example, a hook. As a preference, the securing of the first end 28 of the wire 25 to or at the first connection means 26 is performed by hot or cold crimping.

For example, the penultimate pole n−1 is wound after the last pole n. Thus, for example, as illustrated in FIG. 1, for a four-pole wound rotor with poles 1, 2, 3, 4, the pole 1 is wound first of all, then the pole 2 is wound, then the pole 4 is wound and finally the pole 3 is wound last. Thus, for example, as illustrated in FIG. 2, for a six-pole rotor with poles 1, 2, 3, 4, 5, 6, the pole 1 is wound first of all, then the pole 2 is wound, then the pole 3 is wound, then the pole 4 is wound, then the pole 6 is wound and finally the pole 5 is wound last.

Alternatively, the antepenultimate pole n−2 is for example wound after the last pole n (this is not illustrated).

Alternatively still, the antepenultimate pole n−2 and the penultimate pole n−1 are for example wound before the last pole n (this is not illustrated).

As a preference, as illustrated particularly in FIGS. 1 and 3, before it reaches the first pole 1 to be wound at this pole, which is to say upstream of the first pole 1 according to the direction of winding, the wire 25 is brought to bear against the shaft 21 and/or the slipring 22. In other words, before the first pole 1, the wire is bearing on a portion 10 of the circumference (indicated in dotted line in FIG. 3) of the shaft 21 and/or of the slipring 22. This resting is over a first non-zero angle α about the main axis A and the magnitude of which is dependent on the number of poles of the rotor. For example, as illustrated in FIG. 3, it is greater than 45°. What is necessary is to provide contact and then maximize it.

Note that after winding the n poles, a second end 29 of the wire 25 is attached to a second connection means 27 arranged on the shaft 21 and/or on the slipring 22.

As a preference, the second connection means 27 is arranged on the opposite side of the main axis A to the first connection means 26. In other words, the first connection means 26 and the second connection means 27 are arranged symmetrically, or substantially symmetrically, about the main axis A. Thus, as a preference, the second connection means 27 is positioned near the pole 1.

The second connection means 27 is, for example, a hook. As a preference, the second end 29 of the wire 25 is attached to or at the second connection means 27 by hot or cold crimping.

As a preference, after the last wound pole, before reaching the second connecting means 27, namely downstream of the last pole wound in the direction of winding, the wire 25 is brought to bear against the shaft 21 and/or the slipring 22. In other words, after the last pole wound, the wire is rested across a portion 11 of the circumference (indicated in dotted line in FIG. 3) of the shaft 21 and/or of the slipring 22. This resting is at a second nonzero angle β about the main axis A and the magnitude of this angle is dependent on the number of poles the rotor has.

Advantageously, as illustrated in FIG. 3, the rotor 20 comprises pins 23 notably intended to facilitate the winding of the wire 25. For example, at least one pin 23 is arranged between two adjacent poles and/or at least one pin 23 is arranged between each pole and the shaft 21 and/or the slipring 22. For example, as is the case in the embodiment illustrated in FIG. 3, two pins 23 are positioned near each pole, between each pole and the shaft 21 and/or the slipring 22. As a preference, the pins 23 run parallel, or substantially parallel, to the main axis A.

One execution of a method for obtaining the wound rotor 20 illustrated in FIG. 3 will now be described.

First of all, a non-wound rotor provided with n poles and a winding wire 25 comprising a first end 28 and a second end 29 are procured. The non-wound rotor is fitted beforehand with a shaft 21 and/or with a slipring 22 with main axis of rotation A. The non-wound rotor is furthermore already provided with a first connection means 26 and with a second connection means 27.

First of all, the first end 28 of the wire 25 is attached to the first connection means 26, for example using crimping. The wire 25 is then laid against the shaft 21 and/or the slipring 22 over an angular portion 10 by bringing the wire 25 close to the pole 1. In other words, the wire is brought the other side of the first connection means 27 with respect to the main axis A. As a preference, in the case of a rotor equipped with pins 23, the wire 25 is passed against at least one pin, for example so as to orient the wire in a direction suitable for the winding of the pole 1 that is therefore to be wound with wire 25.

A step of winding the pole 1 with the wire 25 is then performed. The next procedure is a step of winding the pole 2, possibly after having passed the wire 25 against one or more pins 23 so as to orient the wire for the winding of the pole 2 and/or so as to move away from the winding of the pole 1. The next procedure is a step of winding the pole 3, possibly after having passed the wire 25 against one or more pins 23 so as to orient the wire for the winding of the pole 3 and/or so as to move away from the winding of the pole 2. The next procedure is to wind the pole 4, possibly after having passed the wire 25 against one or more pins 23 so as to orient the wire for the winding of the pole 4 and/or so as to move away from the winding of the pole 3. The next procedure is a step of winding the pole 5, possibly after having passed the wire 25 against one or more pins 23 so as to orient the wire for the winding of the pole 5 and/or so as to move away from the winding of the pole 4. The next procedure is a step of winding the pole 6, possibly after having passed the wire 25 against one or more pins 23 so as to orient the wire for the winding of the pole 6 and/or so as to move away from the winding of the pole 5. The next procedure is a step of winding the pole 8, possibly after having passed the wire 25 against one or more pins 23 so as to orient the wire for the winding of the pole 8 and/or so as to move away from the winding of the pole 6. The next procedure is a step of winding the pole 7, possibly after having passed the wire 25 against one or more pins 23 so as to orient the wire so that it rests against the shaft 21 and/or the slipring 22 and/or so as to move away from the winding of the pole 7.

As a preference, the "outgoing" wire leaving a coil is offset, in a direction parallel or substantially parallel to the main axis A, from the "incoming" wire beginning the winding of the next coil. For example, low walls hugging the sides of the coil are produced in such a way as to ensure a distance between the "outgoing" wire and "incoming" wire. Thus, as a preference, said portions of wire do not come into contact with one another because of the offset in the positions in which they leave and enter the coil. For example, the wire that leads to the connection, or hook, passes over the other portions of the wire.

The wire 25 is then positioned so that it rests against the shaft 21 and/or the slipring 22 over an angular portion 11 so that the wire 25 is brought closer to the pole 1 or in other words to the side of the second connection means 27. The next procedure is to attach the second end 29 of the wire 25 to the second connection means 27, for example using crimping.

Thus, the n poles are wound in series, turn by turn, in their ascending numerical order, the last pole n, pole 8 in the case of FIG. 3, nevertheless not being the last coil to be wound but the last-but-one. The last pole to be wound being the penultimate pole n−1.

For example, the winding of the n poles is performed in series, turn by turn, in their ascending numerical order, the antepenultimate pole n−2 being wound after the last pole n (not illustrated). For example, the winding of the n poles is performed in series, turn by turn, in their ascending numerical order, with the pole n−3 being wound after the last pole n (not illustrated).

By virtue of the invention it is possible to obtain a six-pole rotor with six poles wound in the following order of poles: 1, 2, 3, 4, 6, 5 or 1, 2, 3, 5, 6, 4 or 1, 2, 3, 6, 5, 4.

By virtue of the invention it is possible to obtain an eight-pole rotor with the poles wound in the following order of poles: 1, 2, 3, 4, 5, 6, 8, 7 or 1, 2, 3, 4, 5, 8, 6, 7 or 1, 2, 3, 4, 5, 8, 7, 6.

In general, it is possible to obtain an n-pole rotor with poles wound in the following order: 1, 2, . . . , n−2, n, n−1 or 1, 2, . . . , n−3, n, n−1, n−2 or 1, 2, . . . , n−3, n−1, n, n−2.

In summary, the solution allows the winding scheme to be modified to allow tangential or increased area of contact with the shaft and/or the slipring both when the wire 25 leaves the first connection 26 and when the wire 25 arrives at the second connection 27. For example, the change to the order of winding of the poles offers an angular return (which is to say a return in the counterclockwise direction, with the poles numbered in the clockwise direction) about the main axis A of the order of 45 degrees for the arrival of the wire 25 at the second connection 27. As a preference, as mentioned previously, it is not simple tangency with the shaft and/or with the slipring that is obtained but an angular contact portion 10 where the wire leaves the first connection 26 and an angular contact portion 11 where the wire arrives at the second connection 27.

As a preference, the contact of the wire 25 over the angular portions 10, 11 is directly with the slipring, particularly with an insulated, for example plastic coated and/or made of plastic, part of the slipring. Alternatively or in addition, an insulating sheath may be provided on the wire, notably over the relevant length of wire, to provide this insulation.

Furthermore, such a mutually-opposed configuration of the connecting means 26, 27 with respect to the axis A promotes a longer length over which the wire 25 rests against the shaft or the slipring before winding and after winding.

The solution therefore offers significant relief of the loading of each angular bearing portion 10, 11, ensuring the mechanical robustness of each connection of the wire to the slipring and/or the shaft.

The solution makes it possible to avoid the need to resort to overmolding which is a lengthy, costly and risky process. Specifically, in operation, if the overmolding material should crack, the wire could be severed.

The solution can be applied to electric machines with different polarities, for example the rotors of which comprise six poles, or even comprise more than eight poles. As illustrated in FIG. 1, it is also compatible with an electric machine comprising a four-pole rotor so as to increase the region of contact with the slipring if necessary.

By virtue of the solution, the routing of the winding wire with respect to the connections, both the first connection and the second connection, avoids any poor positioning of the wire. The residual stress in the connections (tension in the wire and in the connection at the moment of attachment of the wire to the hook by crimping for example) and/or rotational mechanical stresses (centrifugal force) are reduced if not to say eliminated. Any slipping of the wire out of the hook during crimping is avoided as the positioning of the wire within each hook is optimal for proceeding with the crimping operation. Thus, any opening of the hook and/or breakage of the wire and/or breakage of the connection hook are avoided. Specifically, the angle of the wire arriving at the second connection 27 ensures that the wire remains in the closed end of the hook throughout the crimping, this being something of key importance in terms of the quality of the crimping.

The winding method combined with the portion 11 offers improved repeatability of the position of the wire exiting the winding of the last pole wound, notably by virtue of an exit angle θ (illustrated in FIG. 3) that is small in comparison with the winding performed on the last pole wound.

The routing of the winding solution offers the winding wire a mechanical integrity able to withstand the operating stresses, particularly the centrifugal force associated with the rotation of the rotor and/or vibrations. Specifically, the mechanical tension in the wire at the connections is reduced, notably during operation, which is to say rotation, of the rotor. This is obtained particularly as a result of the contact of the wire with the slipring before the wire reaches the connection means 27 for the second end 29 of the wire. Furthermore, thanks to the bearing portions 10, 11, the vibration behavior of the wire between the connections 26, 27 and the pins 23 and/or the nearest winding is improved. This results in a lowering of the transmission of vibration of the wire 25 at the connections 26, 27 thereby eliminating the risk of the wire breaking at the connection points.

Note that the solution according to the invention therefore achieves the desired objective of ensuring the mechanical robustness of the connections of the winding wire to the shaft and/or the slipring of a wound rotor and offers the following advantages:

the cost is particularly low as there is little or no modification to the wound rotor for implementing the winding method;
 the surrounding components are not affected.

The invention claimed is:

1. A wound rotor, comprising:
a shaft with main axis, the shaft comprising a slipring;
a winding wire; and
n wound poles ordered in ascending numerical order obtained by rotation about the main axis,
wherein the n wound poles are wound with the wire in series turn by turn according to their ascending numerical order, although a last pole of the n would poles is not the last to be wound.

2. The wound rotor as claimed in claim 1, wherein the n wound poles are distributed radially about the main axis.

3. The wound rotor as claimed in claim 1, wherein a penultimate pole of the n wound poles is wound after the last pole.

4. The wound rotor as claimed in claim 1, wherein an antepenultimate pole of the n wound poles is wound after the last pole.

5. The wound rotor as claimed in claim 1, wherein upstream of a first pole of the n wound poles, the wire rests against the shaft at a first non-zero angle about the main axis.

6. The wound rotor as claimed in claim 1, wherein downstream of the last pole to be wound, the wire rests against the shaft at a second non-zero angle about the main axis.

7. The wound rotor as claimed in claim 1, further comprising:
pins configured to facilitate the winding of the wire.

8. The wound rotor as claimed in claim 7, wherein the pins run parallel or substantially parallel to the main axis.

9. The wound rotor as claimed in claim 1, further comprising:
pins configured to facilitate the winding of the wire between two adjacent poles and/or between each pole and the shaft and/or the slipring.

10. The wound rotor as claimed in claim 9, wherein the pins run parallel or substantially parallel to the main axis.

11. An electric machine, comprising:
the wound rotor as claimed in claim 10.

12. A vehicle, comprising:
the electric machine as claimed in claim 11.

13. The vehicle as claimed in claim 12, wherein the vehicle is a motor vehicle.

14. A vehicle, comprising:
the wound rotor as claimed in claim 10.

15. The vehicle as claimed in claim 14, wherein the vehicle is a motor vehicle.

16. A method for obtaining the wound rotor as claimed in claim 1, comprising:
winding the n poles with the wire in series turn by turn in their ascending numerical order, although the last pole is not the last to be wound.

* * * * *